(12) United States Patent
Watanabe et al.

(10) Patent No.: US 9,973,019 B2
(45) Date of Patent: May 15, 2018

(54) CHARGING CURRENT SETTING METHOD, A CHARGING METHOD, A CHARGING APPARATUS, AND AN ACTUATOR

(71) Applicant: HONDA MOTOR CO., LTD., Tokyo (JP)

(72) Inventors: Shinya Watanabe, Tochigi (JP); Hitoshi Saito, Tochigi (JP); Yasuhisa Saito, Tochigi (JP); Hironori Sawamura, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/353,436

(22) Filed: Nov. 16, 2016

(65) Prior Publication Data

US 2017/0170666 A1  Jun. 15, 2017

(30) Foreign Application Priority Data

Dec. 9, 2015 (JP) ................. 2015-240213

(51) Int. Cl.
  *H02J 7/00* (2006.01)
  *H01M 10/0525* (2010.01)
  *H01M 10/44* (2006.01)

(52) U.S. Cl.
  CPC ......... *H02J 7/007* (2013.01); *H01M 10/0525* (2013.01); *H01M 10/443* (2013.01); *H02J 7/0021* (2013.01)

(58) Field of Classification Search
  CPC ....... Y02E 60/12; H02J 7/0042; H02J 7/0045; H01M 10/46; H01M 10/44
  USPC ......................................... 320/107
  See application file for complete search history.

(56) References Cited

U.S. PATENT DOCUMENTS

| | | | | |
|---|---|---|---|---|
| 2001/0001533 A1* | 5/2001 | Stuck Andersen | ... | H01M 10/44 320/150 |
| 2002/0024321 A1* | 2/2002 | Rouverand | ........... | H02J 7/0091 320/150 |
| 2002/0167295 A1* | 11/2002 | Yamashita | ............ | H02J 7/0013 320/150 |
| 2003/0169018 A1* | 9/2003 | Berels | ....................... | H02J 1/14 320/132 |
| 2006/0255771 A1* | 11/2006 | Sakakibara | ........... | H02J 7/0003 320/150 |
| 2007/0145954 A1* | 6/2007 | Kawahara | ........... | B60L 11/1864 320/150 |

FOREIGN PATENT DOCUMENTS

| | | |
|---|---|---|
| CN | 101252212 | 8/2008 |
| CN | 101346849 | 1/2009 |
| CN | 102331314 | 1/2012 |
| JP | 09-019074 | 1/1997 |
| JP | 3509382 | 1/2004 |

OTHER PUBLICATIONS

Chinese Office Action/Search Report dated Feb. 26, 2018, 10 pages.

* cited by examiner

*Primary Examiner* — Arun Williams
(74) *Attorney, Agent, or Firm* — Rankin, Hill & Clark LLP

(57) ABSTRACT

A charging current setting method includes an upper limit temperature recognition step which recognizes an upper limit temperature of the secondary battery (11), an actual temperature recognition step which recognizes an actual temperature of the secondary battery (11), a maximum power recognition step which recognizes an maximum power according to a heat quantity which the secondary battery (11) allows during a charge period based on a difference between the upper limit temperature and the actual temperature, a thermal resistance of the secondary battery (11), and a length of a predetermined period and the charge period, and a current setting step which sets a charge current to be an upper limit value or less by recognizing the upper limit value of the charge current of the secondary battery (11) based on an endothermic and exothermic characteristics map of the secondary battery (11) with respect to current and the maximum power.

9 Claims, 8 Drawing Sheets

CHARGING CURRENT SETTING METHOD, A CHARGING METHOD, A CHARGING APPARATUS, AND AN ACTUATOR

BACKGROUND OF THE INVENTION

Field of the Invention

The present invention relates to a charging current setting method, a charging method, a charging apparatus for a secondary battery which repeats a cycle including a predetermined charge period and a predetermined discharge period, and an actuator including the charging apparatus.

Description of the Related Art

Hitherto, there is known an actuator including an end effector which repeats a cycle including a predetermined operation time and a predetermined rest time. For example, there is known an actuator or the like for performing various processing to a work piece which has been conveyed in a vehicle manufacturing factory or the like.

As such actuators, there are actuators in which a chargeable secondary battery is installed in the end effector itself in order to omit the feeding cable. In such actuators, the rest time of the end effector such as the exchanging time or the like of the work piece is used as the charge period of the secondary battery, and the operation time when the end effector performs the predetermined operation is the discharge period of the secondary battery.

A lithium ion capacitor is known as the secondary battery which is installed in such actuators. Furthermore, as a charging control method of the lithium ion capacitor, there is known to control the charge current so as to generate endothermic reaction in a case where the temperature of the lithium ion capacitor reaches a specified temperature during charging (for example, refer to Japanese Patent No. 3509382).

SUMMARY OF THE INVENTION

Problems to be Solved by the Invention

However, in order to decrease the charge current to a current value for generating endothermic reaction, it is necessary to make the charge current sufficiently small. Therefore, there was a problem that the charging would be insufficient by the same charging time as the case of not reducing the current value.

Moreover, if it is attempted to sufficiently charge by a small current which generates endothermic reaction, it is necessary to increase the charging time. That is, there is a problem that although it is possible to extend the lifetime of the battery, charging cannot be finished within the determined time.

On the other hand, there was a problem that if the charging is performed at a current value which does not generate endothermic reaction in order to shorten the charging time, the temperature of the lithium ion capacitor rises, thereby causing to shorten the lifetime of the secondary battery to a large extent.

The present invention has been made with view of the above points, and it is an object of the invention to provide a charging current setting method, a charging method, a charging apparatus, and an actuator including the charging apparatus, which can suppress the shortening of the lifetime of the second battery by predicting the heat generation quantity allowed during charging in advance, and also which can shorten the charge period.

Solution for Solving the Problem

A charging current setting method of the present invention is a charging current setting method for a secondary battery which repeats a predetermined period including a discharge period and a charge period, including: an upper limit temperature recognition step which recognizes an upper limit temperature allowed by the secondary battery; an actual temperature recognition step which recognizes an actual temperature of the secondary battery; a maximum power recognition step which recognizes a maximum power according to heat quantity which the secondary battery can allow during the charge period based on a difference between the upper limit temperature and the actual temperature, a thermal resistance of the secondary battery, a length of the predetermined period, and a length of the charge period; and a current setting step which sets current to be flown when charging the secondary battery to be an upper limit value or less by recognizing the upper limit value of the charge current with respect to the secondary battery based on a relational expression or an endothermic and exothermic characteristics map indicating a relation of an exothermic amount or an endothermic amount of the secondary battery with respect to current, and the maximum power.

The charge current set by the charge current setting step of the present invention is determined to have an upper limit value based on the recognized upper limit temperature of the secondary battery and a charge period length in one predetermined period. Therefore, in the case of charging by such current, the temperature of the secondary battery is prevented from exceeding the upper limit temperature even in a secondary battery whose object to be charged repeats the predetermined period including the discharge period and the charge period. In this regard, according to the charging current setting method of the present invention, it is able to set a charge current capable of suppressing the shortening of lifetime of the secondary battery and also capable of shortening the charge period.

Here, in the "predetermined period", the charge period and the discharge period in such predetermined period may be the same or different from those of other predetermined periods.

Moreover, "recognizes" indicates to obtain the subject value by means such as direct measurement, calculation using related parameters, acquiring from a pre-obtained map, or the like.

Moreover, "discharge period" includes not only the case of discharging throughout the total discharge period, but also the case of discharging at least in a part of the discharge period and the discharge is stopped in the rest of the period. Furthermore, "charge period" includes not only the case of charging throughout the total charge period, but also the case of charging at least in a part of the charge period and the charge is stopped in the rest of the period.

In the charging current setting method of the present invention, it is preferable that in the current setting step, current is set to the upper limit value or less, and also preferentially set within a range an endothermic reaction occurs at the secondary battery.

In a secondary battery such as a lithium ion capacitor or the like, exothermic reaction or endothermic reaction occurs depending on the current for charging. In a case of charging such a secondary: battery, by setting as the charge current, current which is the recognized upper limit value or less and also preferentially within a range in which the endothermic reaction occurs at the secondary battery, it becomes easier to generate endothermic reaction at the secondary battery when charging the secondary battery with the set current. As a result, the temperature increase of the secondary battery can be further suppressed by the endothermic reaction, thereby further becoming easier to suppress the shortening of the lifetime of the secondary battery.

Moreover, according to the charging current setting method of the present invention, it is preferable that in the upper limit temperature recognition step, the upper limit temperature of the secondary battery is recognized based on a relational expression or a map indicating a change of lifetime of the secondary battery with respect to a temperature of the secondary battery when used, and based on an expected lifetime of the secondary battery.

The duration until the internal resistance of the secondary battery rises to a degree in which the secondary battery is unusable (i.e. lifetime), is influenced by the temperature when being used. Therefore, by recognizing the upper limit temperature based on the relational expression or the map indicating the change of lifetime of the secondary battery with respect to the temperature at the time of use and based on the expected lifetime of the secondary battery (estimating the heat generation quantity permissible at the time of charging in advance), it is likely to obtain the upper limit temperature which does not shorten the lifetime of the secondary battery to become the expected lifetime or less. As a result, the lifetime of the secondary battery is likely to be suppressed from being shortened to the expected lifetime or less.

Moreover, according to the charging current setting method of the present invention, it is preferable that in the actual temperature recognition step, the actual temperature of the secondary battery is recognized based on a power consumption and the thermal resistance of the secondary battery in the predetermined period.

Moreover, according to the charging current setting method of the present invention, it is preferable that in the actual temperature recognition step, the actual temperature of the secondary battery is recognized based on the power consumption of the secondary battery in the predetermined period, the thermal resistance, and a temperature of a housing of the secondary battery or a temperature of cooling medium which cools the secondary battery.

By recognizing the actual temperature of the secondary battery based on the power consumption and the thermal resistance of the secondary battery in the predetermined period, more preferably, in addition, based on the temperature of the housing of the secondary battery or the temperature of the cooling medium which cools the secondary battery, it becomes possible to recognize the temperature of the secondary battery more correctly. Furthermore, it is possible to make the current set by using the recognized actual temperature to be more appropriate. As a result, it is possible to further suppress the shortening of the lifetime of the secondary battery and also to shorten the charge period.

Moreover, the charging method of the present invention is a charging method for a secondary battery which repeats a predetermined period including a discharge period and a charge period, including; an upper limit temperature recognition step which recognizes an upper limit temperature allowed by the secondary battery; an actual temperature recognition step which recognizes an actual temperature of the secondary battery; a maximum power recognition step which recognizes a maximum power according to heat quantity which the secondary battery can allow during the charge period based on a difference between the upper limit temperature and the actual temperature, a thermal resistance of the secondary battery, a length of the predetermined period, and a length of the charge period; a current setting step which sets current to he flown when charging the secondary battery to be an upper limit value or less by recognizing the upper limit value of the charge current with respect to the secondary battery based on a relational expression or an endothermic and exothermic characteristics map indicating a relation of an exothermic amount or an endothermic amount of the secondary battery with respect to current, and the maximum power; and a charging step which charges the secondary battery with the current set in the current setting step.

Moreover, the charging apparatus of the present invention is a charging apparatus for a secondary battery which repeats a predetermined period including a discharge period and a charge period, including: a charging unit which supplies current to charge the secondary battery; a control unit which controls the current supplied to the secondary battery by the charging unit; and an input unit, wherein the control unit includes, an upper limit temperature recognition unit which recognizes an upper limit temperature of the secondary battery based on a value input by the input unit, a state recognition unit which recognizes a state of the secondary battery, an actual temperature recognition unit which recognizes an actual temperature of the secondary battery based on the state of the secondary battery recognized by the state recognition unit, a maximum power recognition unit which recognizes a maximum power according to heat quantity which the secondary battery can allow during the charge period based on a difference between the upper limit temperature and the actual temperature, a thermal resistance of the secondary battery, a length of the predetermined period, and a length of the charge period, an endothermic and exothermic characteristics information storing unit which stores a relational expression or an endothermic and exothermic characteristics map indicating a relation of an exothermic amount or an endothermic amount of the secondary battery with respect to current, and a current setting unit which sets current supplied from the charging unit to be an upper limit value or less by recognizing the upper limit value of the charge current with respect to the secondary battery based on the relational expression or the endothermic and exothermic characteristics map, and the maximum power.

In the charging apparatus of the present invention, current supplied when charging is determined to have an upper limit value based on the recognized upper limit temperature of the secondary battery and charge period length in one predetermined period. Therefore, in a case of charging by such current, even when the object to be charged is a secondary battery which repeats the predetermined period which includes a discharge period and a charge period corresponding to the discharge period, the temperature of the secondary battery is prevented from exceeding the upper limit temperature. Therefore, according to the charge apparatus of the present invention, the shortening of the lifetime of the secondary battery is suppressed while achieving to shorten the charge period.

The actuator of the present invention is an actuator equipped with a secondary battery which repeats a predetermined period including a discharge period and a charge period, including: a charging apparatus which charges the secondary battery as recited above; and an end effector which is installed with the secondary battery and which operates by power supplied from the secondary battery during the discharge period of the secondary battery.

Since the actuator of the present invention includes the above charging apparatus, the shortening of the lifetime of the secondary battery is suppressed while the charge period of the secondary battery (i.e. the rest time of the end effector) is shortened. Therefore, the operation efficiency can be improved and the shortening of the lifetime of the secondary power source can be suppressed. Therefore, according to the actuator of the present invention, it is able to suppress the increase of operation cost.

Moreover; the actuator of the present invention is an actuator equipped with a secondary battery which repeats a predetermined period including a discharge period and a charge period, including: a first secondary battery; a second secondary battery; a charging apparatus of above which charges the first secondary battery and the second secondary battery; a first end effector which is equipped with the first secondary battery and which operates by power supplied from the first secondary battery during the discharge period of the first secondary battery; and a second end effector which is equipped with the second secondary, battery and which operates by power supplied from the second secondary battery during the discharge period of the second secondary battery, wherein the second secondary battery is charged during the discharge period of the first secondary battery, and the first secondary battery is charged during the discharge period of the second secondary battery.

Since the actuator of the present invention includes the above charging apparatus, the shortening of the lifetime of the secondary battery is suppressed while the charge period of the secondary battery (i.e. the rest time of the end effector) is shortened. Therefore, the operation efficiency can be improved and the shortening of the lifetime of the secondary power source can be suppressed.

Moreover, the actuator of the present invention includes two end effectors, and the discharge period of the secondary battery installed in one of the end effectors is used as the charge period of the secondary battery installed in the other end effector.

As a result, the actuator of the present invention can suppress the temperature rise of the secondary battery by decreasing the current flown in the secondary battery during the charge period compared to the configuration in which only one end effector and a secondary battery are included. Moreover, since the rest tune of one of the end effectors is the operation time of the other end effector, the time unable to operate becomes shorter as the whole actuator.

Therefore, according to the actuator of the present invention, the operation efficiency can be further improved and the shortening of the lifetime of the secondary power source can be suppressed compared to the configuration in which only one end effector and a secondary battery are included.

BRIEF DESCRIPTION OF THE DRAWINGS

FIG. 1A and FIG. 1B are perspective views illustrating elements in the periphery of an end effector of an actuator according to a first embodiment of the present invention, in which FIG. 1A illustrates a state of an operation position and FIG. 1B illustrates a state in a rest position;

FIG. 7A and FIG. 7B are load profiles of an actuator according to a first modified example of the first embodiment, in which FIG. 7A is a load profile of a first lithium ion capacitor and FIG. 7B is a load profile of a second lithium ion capacitor.

DESCRIPTION OF THE PREFERRED EMBODIMENTS

First Embodiment

Referring to FIG. 1 to FIG. 7, the following will explain an actuator I according to a first embodiment.

Figure 1A:
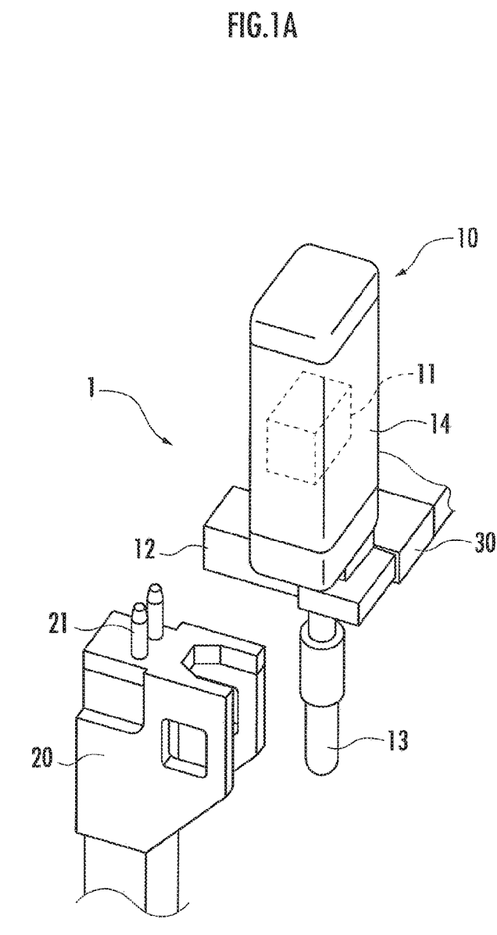
Figure 1B:
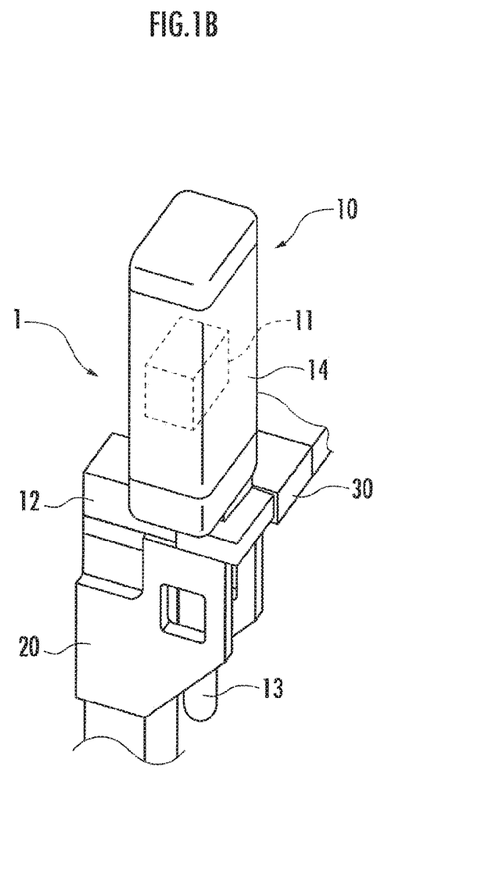
Figure 2:
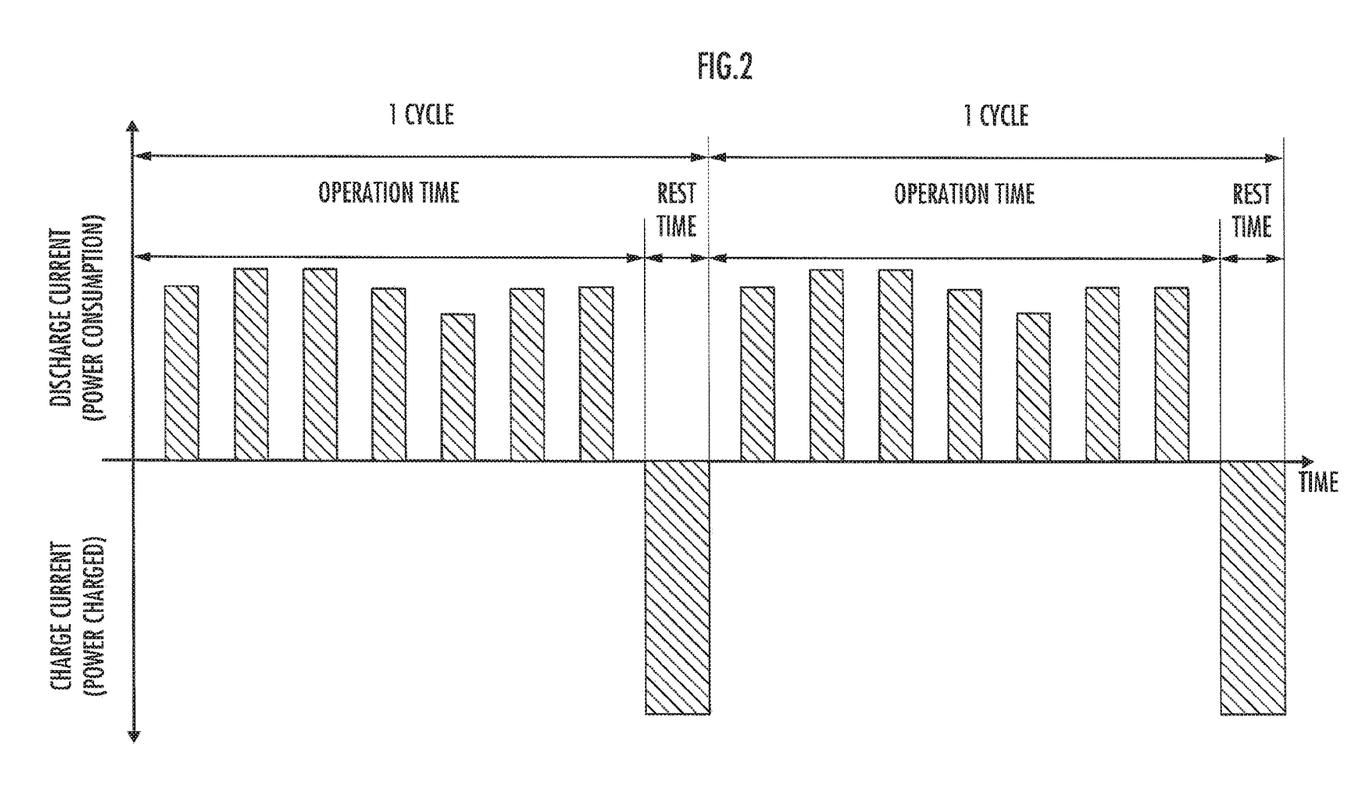
FIG. 2 illustrates a current profile of the actuator of FIG. 1.

First, referring to FIG. 1 and FIG. 2, the features schematically constituting the actuator 1 are explained.

The actuator I includes an end effector 10, a charging apparatus 20 which charges a lithium ion capacitor 11 (a secondary battery) installed in the end effector 10, and an arm 30 which moves the end effector 10 to an operation position and a rest position.

The end effector 10 includes the lithium ion capacitor 11 installed inside thereof, an end effector side terminal 12 which supplies charge current from the charging apparatus 20 to the lithium ion capacitor 11, an electric tool 13 driven by the power supplied from the lithium ion capacitor 11, a case 14 (housing) which covers the lithium ion capacitor 11, and a cooling apparatus which is not illustrated for cooling the lithium ion capacitor 11.

The lithium ion capacitor 11 uses carbon-based material capable of occluding lithium ion as the negative electrode material, and has both of the characters of an electric double layered capacitor and a lithium ion secondary battery. Exothermic reaction or endothermic reaction occurs depending on the discharge current or the charge current at this lithium ion capacitor 11 (refer to FIG. 5).

Here, although such a lithium ion capacitor 11 is used as the secondary battery in the present embodiment, the present invention can be applied to a secondary battery other than the lithium ion capacitor.

The end effector side terminal 12 is configured so as to be electrically connectable to a charging apparatus side terminal 21 (charging unit). More specifically, the end effector side terminal 12 is a terminal arranged inside a hole provided at a lower surface side of a portion of the end effector 10 held by the arm 30. When the charging apparatus side terminal 21 is inserted in the hole, the end effector side terminal 12 contacts the charging apparatus side terminal 21 to be electrically connected.

Therefore, the end effector side terminal 12 and the charging apparatus side terminal 21 become an electrically connected state when the end effector 10 is moved to the rest position (the position of FIG. 1B) by the arm 30, and become an electrically non-connected state when the end effector 10 is moved to the operation position (for example, the position of FIG. 1A) by the arm 30.

In the connected state of the end effector side terminal 12 and the charging apparatus side terminal 21, when current is supplied to the lithium ion capacitor 11 from the charging apparatus side terminal 21 via the end effector side terminal 12, the lithium ion capacitor 11 is charged.

The electric tool 13 operates when current is supplied from the lithium ion capacitor 11. The end effector 10 is able to perform various operations (for example, bolt fastening or the like when manufacturing a vehicle) by the movement of this electric tool 13.

The cooling apparatus cools the outer peripheral surface of the lithium ion capacitor 11 arranged inside the case 14 by circulating a cooling medium between the case 14 and the lithium ion capacitor 11. The cooling apparatus may he omitted depending on the using situation of the actuator 1.

Figure 3:
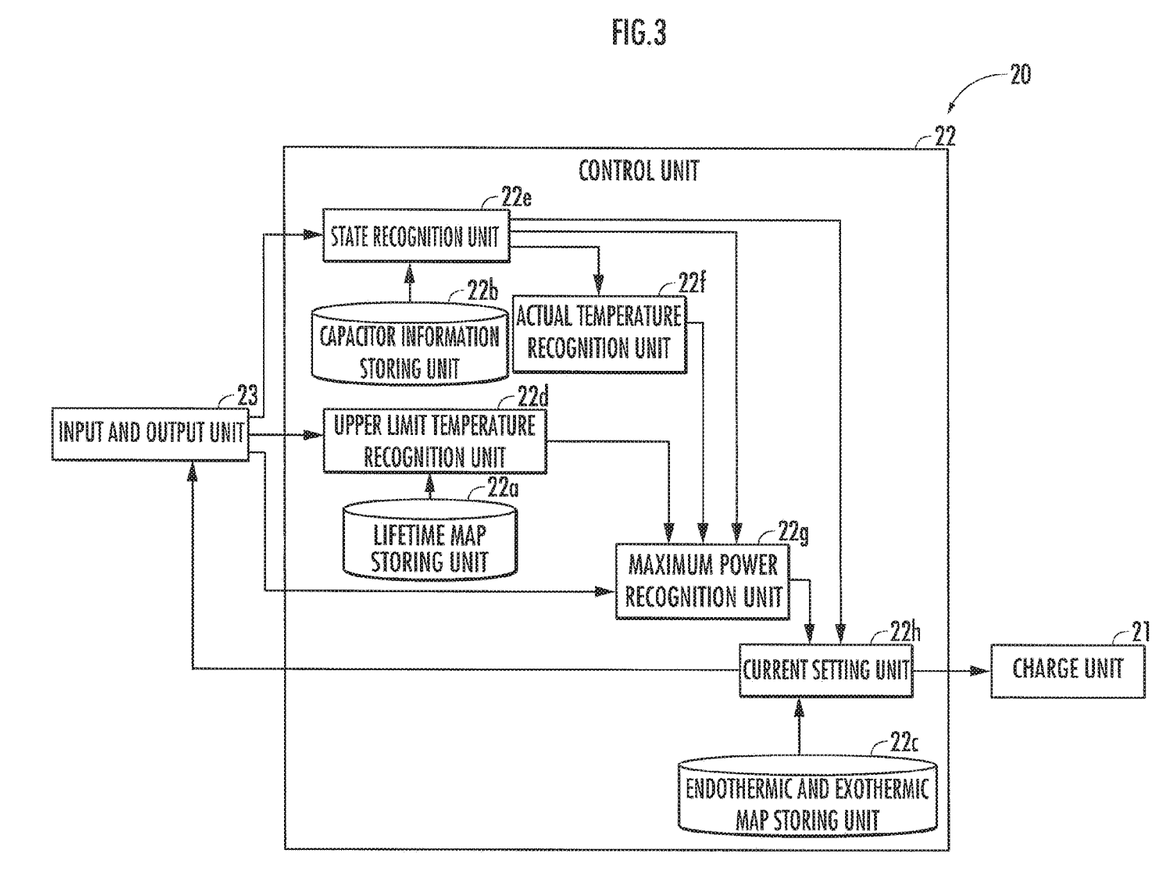
FIG. 3 is a block diagram illustrating a configuration of a charging apparatus of the actuator of FIG. 1.

As shown in FIG. 3, the charging apparatus 20 includes the charging apparatus side terminal 21 as the charging unit, a control unit 22, and an input and output unit 23 as the input unit.

The charging apparatus side terminal 21 supplies current which is set by the control unit 22 to the connected end effector side terminal 12.

The control unit 22 sets the current to be supplied to the lithium ion capacitor 11 from the charging apparatus side terminal 21 by a method described later, and controls the charge current of the lithium ion capacitor 11.

The input and output unit 23 is used for the user of the actuator I to input various parameters and also for the user to confirm information output from the control unit 22.

In the actuator 1 configured as such, the end effector 10 is moved by the arm 30 to a predetermined operation position (for example, the position of FIG. 1A) and to a predetermined rest position (position of FIG. 1B) by a predetermined interval.

Furthermore, when the end effector 10 is positioned at the operation position, power is supplied to the electric tool 13 from the lithium ion capacitor 11, and the electric tool 13 is driven. On the other hand, when the end effector 10 is positioned at the rest position, current is supplied to the lithium ion capacitor 11 from the charging apparatus side terminal 21 via the end effector side terminal 12, and the lithium ion capacitor 11 is charged.

More specifically, as shown in FIG. 2, discharge is performed intermittently for a plurality of times from the lithium ion capacitor 11 during the operation time (that is, the electric tool 13 is driven intermittently for a plurality of times), and charging is performed during the rest time.

In other words, the lithium ion capacitor 11 is used so as to repeat a cycle (a predetermined period) including a discharge period (i.e. the operation time of the end effector 10) and a charge period (i.e. the rest time of the end effector 10).

Here, in the actuator of the present invention, charging is performed by using the end effector side terminal 12 and the charging apparatus side terminal 21. However, the charging apparatus of the present invention is not limited to such configuration, and may be any charging apparatus which can charge the secondary battery. For example, a non-contact type charging device may be used.

Next, referring to FIG. 3 to FIG. 5, the configuration of the control unit 22 of the charging apparatus 20 will be explained.

As shown in FIG. 3, the control unit 22 includes a lifetime map storing unit 22a, capacitor information storing unit 22b, and an endothermic and exothermic map storing unit 22c (endothermic and exothermic characteristics storing unit).

In the lifetime map storing unit 22a, a map showing a change of lifetime of the lithium ion capacitor 11 with respect to the temperature of the lithium ion capacitor in use which is obtained in advance.

Figure 4:
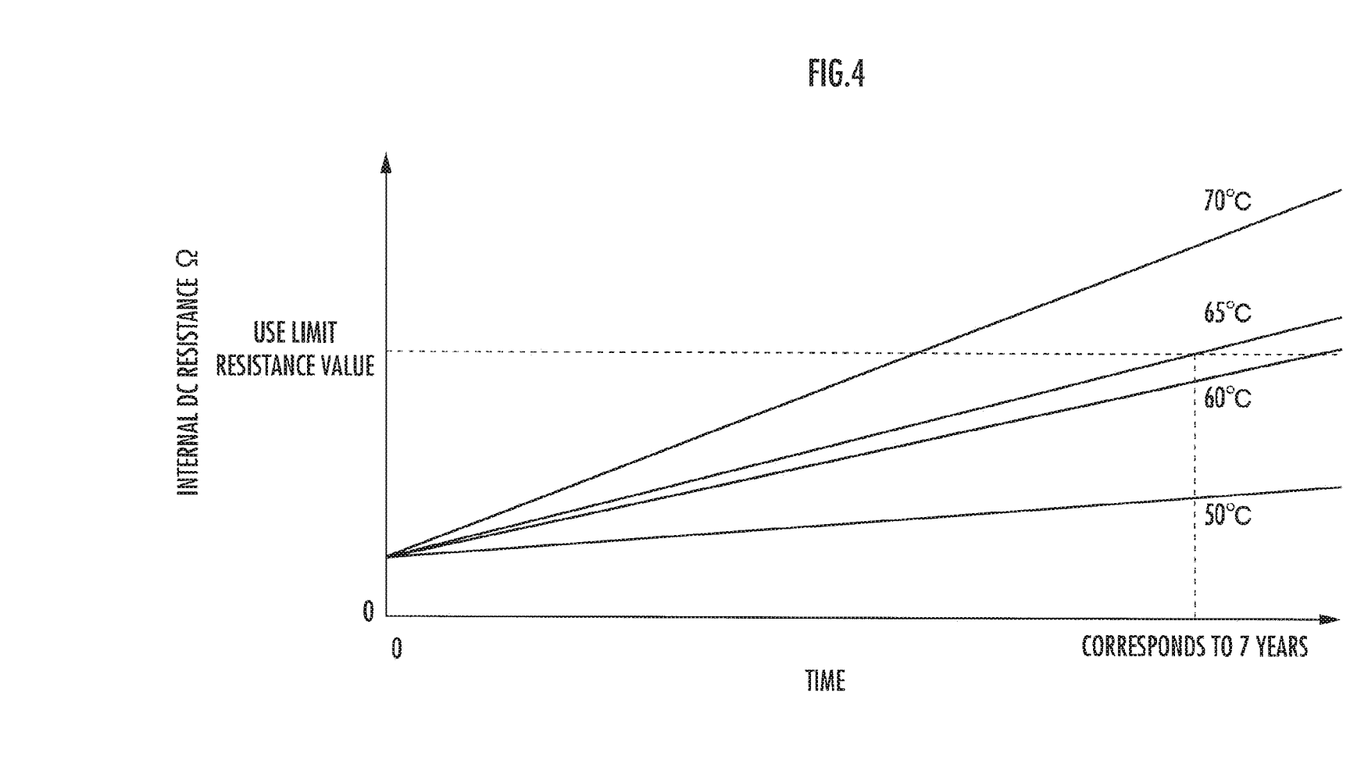
FIG. 4 is a graph showing a relation between a working temperature and a lifetime of a lithium ion capacitor of the actuator of FIG. 1.

In the present embodiment, a map such as shown in FIG. 4 is stored in the lifetime map storing unit 22a. However, instead of such a map, a relational expression itself indicating the relation between the lifetime and the temperature when being used may be stored in the lifetime map storing unit 22a.

In the capacitor information storing unit 22b, thermal resistance from the cell center of the lithium ion capacitor 11 to the outer peripheral surface, temperature of the cooling medium, current or the like required in the operation time, various parameters of the lithium ion capacitor 11, are stored.

The endothermic and exothermic map storing unit 22c stores an endothermic and exothermic characteristics map indicating a relation of the exothermic amount or the endothermic amount with respect to the charge current or the discharge current of the lithium ion capacitor 11 which is obtained in advance.

Figure 5:
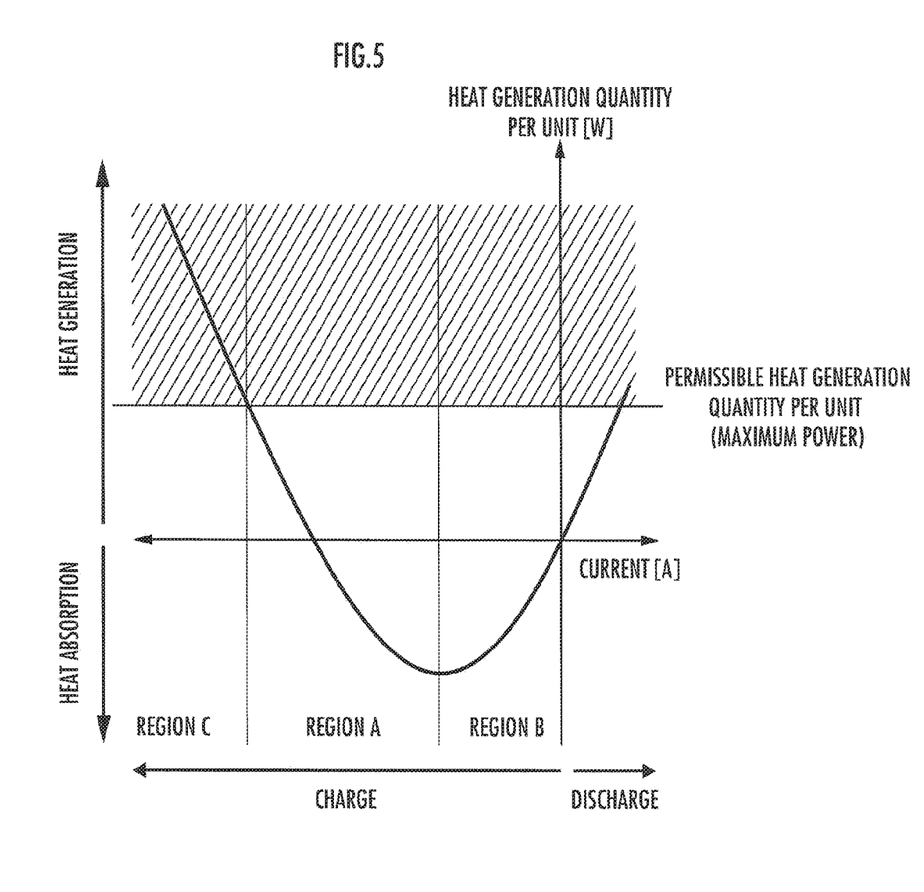
FIG. 5 is a graph showing an exothermic amount or an endothermic amount with respect to discharge current or charge current of the lithium ion capacitor of the actuator of FIG. 1.

In the present embodiment, a map such as shown in FIG. 5 is stored in the endothermic and exothermic map storing unit 22c. However, instead of such a map, a relational expression itself indicating the relation of the exothermic amount or the endothermic amount of the secondary battery with respect to current may be stored in the endothermic and exothermic map storing unit 22c.

Moreover, as shown in FIG. 3, the control unit 22 includes an upper limit temperature recognition unit 22d, a state recognition unit 22e, an actual temperature recognition unit 22f, a maximum power recognition unit 22g, and a current setting unit 22h.

The upper limit temperature recognition unit 22d recognizes the upper limit temperature of the lithium ion capacitor 11 based on the parameter input to the input and output unit 23.

The state recognition unit 22e recognizes the parameters of the lithium ion capacitor 11 based on the parameter input to the input and output unit 23 and the parameter acquired from the capacitor information storing unit 22b.

The actual temperature recognition unit 22f recognizes the actual temperature of the lithium ion capacitor 11 based on the parameters of the lithium ion capacitor 11 recognized by the state recognition unit 22e.

The maximum power recognition unit 22g recognizes the maximum power according to the permissible heat quantity of the lithium ion capacitor 11 during the charge period based on the actual temperature recognized by the actual temperature recognition unit 22f, the upper limit temperature recognized by the upper limit temperature recognition unit 22d and the parameters of the lithium ion capacitor 11 recognized by the state recognition unit 22e.

The current setting unit 22h recognizes the upper limit value of the charge current with respect to the lithium ion capacitor 11 based on the endothermic and exothermic characteristics map stored in the endothermic and exothermic storing unit 22c and the maximum power recognized by the maximum power recognition unit 22g, and then sets the current supplied from the charging apparatus side terminal 21 to be equal to or less than the upper limit value.

Figure 6:
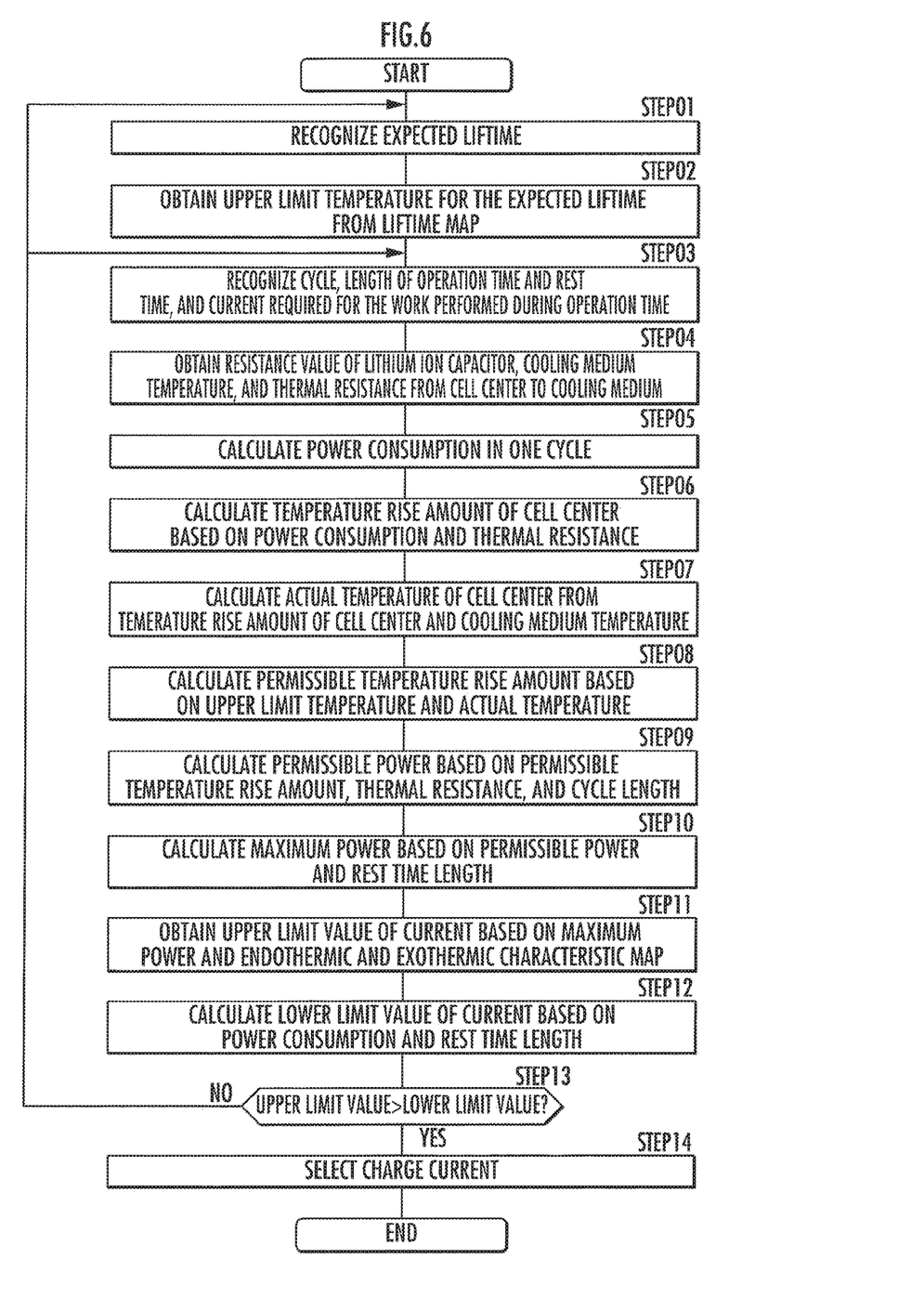
FIG. 6 is a flow chart showing a processing executed when the charging. apparatus of FIG. 3 sets the charge current.

Next, referring to the flowchart of FIG. 6, the processing performed when the control unit 22 of the charging apparatus 20 determines the current to be supplied to the end effector side terminal 12 from the charging apparatus side terminal 21, will be explained.

First, in STEP01, the upper limit temperature recognition unit 22d of the control unit 22 recognizes the expected lifetime of the lithium ion capacitor 11 input to the input and output unit 23 by the user of the actuator 1.

Next, in STEP02, the upper limit temperature recognition unit 22d refers to the map indicating the change of lifetime of the lithium ion capacitor 11 with respect to the temperature of the lithium ion capacitor 11 in use stored in the lifetime map storing unit 22a (refer to FIG. 4), and acquires the upper limit temperature Tmax[20 C.] of the lithium ion capacitor 11.

More specifically, the intersection point of the time corresponding to the expected lifetime (7 years in the present embodiment) and the value of internal DC resistance at which the lithium ion capacitor becomes unusable (use limit resistance value) is obtained, and the temperature passing this intersection point is acquired as the upper limit temperature Tmax.

These STEP01 to STEP02 are the upper limit temperature recognition step.

Here, the upper limit temperature Tmax is not necessarily acquired by referring to the map, and a value directly input to the input and output unit 23 by the user may be used. Moreover, in a case where the calculation expression is stored in the lifetime map storing unit 22a instead of the map, the upper limit temperature Tmax may be calculated based on the input expected lifetime. Moreover, in the present embodiment, although the upper limit temperature recognition step is divided into 2 steps and performed, it may be performed by collectively calculating in one step.

Next, in STEP03, the state recognition unit 22e recognizes a length of operation time t1[s], a length of rest time t2[s], and a length of a cycle t3[s] of the end effector 10, and also the working current In[A] required for the operation performed in the operation time, based on a value input to the input and output unit 23 by the user of the actuator 1.

More specifically, in STEP03, the state recognition unit 22e acquires the time required for the operation itself or the time required for moving or the like from the capacitor information storing unit 22b based on the type or the number of times of the operation to be performed by the end effector 10 input by the user, and then calculates the length of the operation time t1, the length of the rest time t2, and the length of the cycle t3. Moreover, the state recognition unit 22e calculates the working current In required for the operation to be performed in the operation time t1 based on the input type or number of times, or the like of the operation to be performed by the end effector 10.

Next, in STEP04, the state recognition unit 22e acquires from the capacitor information storing unit 22b, the resistance R[Ω] of the lithium ion capacitor 11, cooling medium temperature Tc[° C.] which is the temperature of the cooling medium, and the thermal resistance TR[° C./W] from the cell center of the lithium ion capacitor 11 to the outer peripheral surface (cooling medium).

Next, in STEP05, the state recognition unit 22e calculates the power consumption Pc[W] consumed by the lithium ion capacitor 11 in one cycle based on the resistance R of the lithium ion capacitor 11 and the working current In.

Here, in STEP03 to STEP05, the value recognized by the state recognition unit 22e does not necessarily have to be obtained by calculation or acquisition, but a value directly input to the input and output unit 23 by the user may be used.

Next, in STEP06, the actual temperature recognition unit 22f of the control unit 22 calculates the temperature rise amount ΔT[° C.] of the cell center of the lithium ion capacitor 11 in one cycle based on the power consumption Pc consumed at the lithium ion capacitor 11 in one cycle (i.e. the cycle length t3) recognized by the state recognition unit 22e and the thermal resistance TR from the cell center to the outer peripheral surface of the lithium ion capacitor 11.

More specifically, the power consumption Pc[W] and the thermal resistance TR[° C./W] are multiplied to calculate the temperature rise amount ΔT[° C.].

Next, in STEP07, the actual temperature recognition unit 22f calculates the actual temperature Tt[° C.] of the cell center of the lithium ion capacitor 11 based on the calculated temperature rise amount ΔT and the cooling medium temperature Tc recognized by the state recognition unit 22e. More specifically, the temperature rise amount ΔT[° C.] and the cooling medium temperature Tc[° C.] are added to calculate the actual temperature Tt[° C.].

Here, in a case of a configuration which does not use a cooling medium, the actual temperature Tt is calculated based on the calculated temperature rise amount, and the temperature of the outer peripheral surface of the lithium ion capacitor 11 or the surface temperature of the case 14, or the like.

These STEP06 to STEP07 are the actual temperature recognition step. Here, the temperature rise amount of STEP06 or the actual temperature Tt and the cooling medium temperature Tc of STEP07 do not necessarily have to be obtained by calculation or acquisition from the state recognition unit 22e, but may be measured by a separately provided sensor by performing a test operation. Moreover, in the present embodiment, although the actual temperature recognition step is divided into 2 steps and performed, it may be performed by collectively calculating in one step.

Next, in STEP08, the maximum power recognition unit 22g of the control unit 22 calculates the permissible temperature rise amount ΔTa[° C.] which the lithium ion capacitor 11 can allow in a range in which its lifetime does not become equal to or less than the expected lifetime based on the upper limit temperature Tmax recognized by the upper limit recognition unit 22d and the actual temperature Tt recognized by the actual temperature recognition unit 22f. More specifically, the actual temperature Tt[° C.] is subtracted from the upper limit temperature Tmax[° C.] to calculate the permissible temperature rise amount ΔTa[° C.].

Next, in STEP09, the maximum power recognition unit 22g calculates the permissible power Pa[W] which the lithium ion capacitor 11 can allow during a cycle in a range that its lifetime does not become equal to or less than the expected lifetime based on the calculated permissible temperature rise amount ΔTa and the thermal resistance TR from the cell center to the outer peripheral surface of the lithium ion capacitor 11 recognized by the state recognition unit 22e. More specifically, the permissible temperature rise amount ΔTa[° C.] is divided by the thermal resistance TR[° C./W] to calculate the permissible power Pa[W].

Next, in STEP10, the maximum power recognition unit 22g calculates the maximum power Pmax[W] which the lithium ion capacitor 11 can allow at maximum in one cycle within a range in which its temperature does not exceed the upper limit temperature Tmax, based on the calculated permissible power Pa and the length of rest time t2 and the length of cycle t3 recognized by the state recognition unit 22e. More specifically, a value obtained by multiplying the permissible power Pa[W] and the length of cycle t3[s], is divided by the length of rest time t2[s] to calculate the maximum power Pmax[W].

These STEP08 to STEP10 are the maximum power recognition step. Moreover, in the present embodiment, although the maximum power recognition step is performed through three steps, it may be performed by collectively calculating in one step.

Next, in STEP11, the current setting unit 22h of the control unit 22 collates the maximum power Pmax calculated by the maximum power recognition unit 22g with the endothermic and exothermic characteristics map indicating the relation of exothermic amount or the endothermic amount with respect to the charge current or the discharge current of the lithium ion capacitor 11 stored in the endothermic and exothermic map storing unit 22c so as to acquire the maximum current Imax[A] (the upper limit value of the current) which the lithium ion capacitor 11 can allow in one cycle in a range in which its lifetime does not become equal to or less than the expected lifetime. More specifically, the value overlapping the boundary line of region A and region C in FIG. 5 becomes the maximum current Imax.

Next, in STEP12, the current setting unit 22h calculates the minimum charge current Imin[A] (the lower limit value of current) which is minimum necessary to charge the lithium ion capacitor 11 based on the power consumption Pc and the length of the rest time t2 recognized by the state recognition unit 22e.

Next, in STEP13, the current setting unit 22h compares the calculated upper limit value and the lower limit value of current.

Here, in the case that the lower limit value of the current is higher than the upper limit value (NO in STEP13, the case in which the lower limit value is in region A or region B in FIG. 5), the control unit 22 displays at the input and output unit 23 to prompt to change the expected lifetime or the rest time. According to this display, if the user changes the expected lifetime or changes the rest time, the processing of STEP01 to STEP13 or the processing of STEP03 to STEP13 is executed again. On the other hand, in the case that the lower limit value of the current is lower than the upper limit value (YES in STEP13, the case in which the lower limit value is in region C in FIG. 5), the processing proceeds to STEP14.

Next, in STEP14, the current setting unit 22h sets the value of current to be flown when charging the lithium ion capacitor 11 within a range defined by its upper limit value and the lower limit value. This STEP14 is the current setting step.

At this time, the set current can be any value as long as it is within the set range. However, in the case of intending to further extend the lifetime of the lithium ion capacitor 11, a value close to the value having the largest endothermic reaction in the characteristic of the lithium ion capacitor 11 (a value overlapping the boundary line of region A and region B in FIG. 5) should be selected. On the other hand, in the case of intending to shorten the rest time, the upper limit value which is the largest value within the range should be selected (a value overlapping the boundary line of region A and region C in FIG. 5).

When the value of the charge current is set as above, the control unit 22 terminates the present processing, and charges the lithium ion capacitor 11 by the set current via the charging apparatus side terminal 21 which is the charging unit thereof (charging step).

As explained above, according to the actuator 1 of the present embodiment, the value of current supplied when charging the lithium ion capacitor 11 is a value in which the upper limit value is determined based on the upper limit temperature Tmax and the length of the charge period in one cycle (i.e. the length of rest time t2) of the lithium ion capacitor 11.

Therefore, according to the actuator 1 of the present embodiment which charges the lithium ion capacitor 11 with such current, the temperature of the lithium ion capacitor 11 is prevented from exceeding the upper limit temperature Tmax even if the lithium ion capacitor 11 is used so as to repeat the cycle including the discharge period and the charge period.

Accordingly, in the actuator 1 of the present embodiment, it is able to suppress the shortening of the lifetime of the lithium ion capacitor 11 while attaining to shorten the charge period.

Here, a modified example of the actuator 1 of the present embodiment will be explained referring to FIG. 7.

In the actuator 1 of the present embodiment, one end effector 10 is moved to the operation position and the rest position by one arm 30, and then the lithium ion capacitor 11 installed in the end effector is charged when moved to the rest position.

On the other hand, the actuator according to the modified example is configured such that two end effectors are alternately held by one arm, and while one end effector is moved to the operation position for performing the operation, the other end effector is positioned at the rest position to charge the lithium ion capacitor installed therein.

Figure 7A:
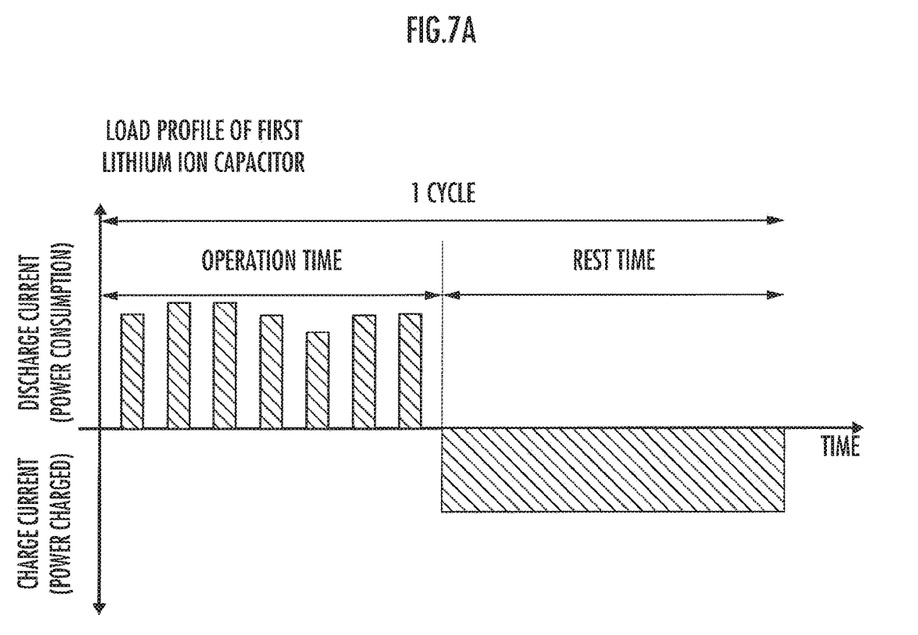
Figure 7B:
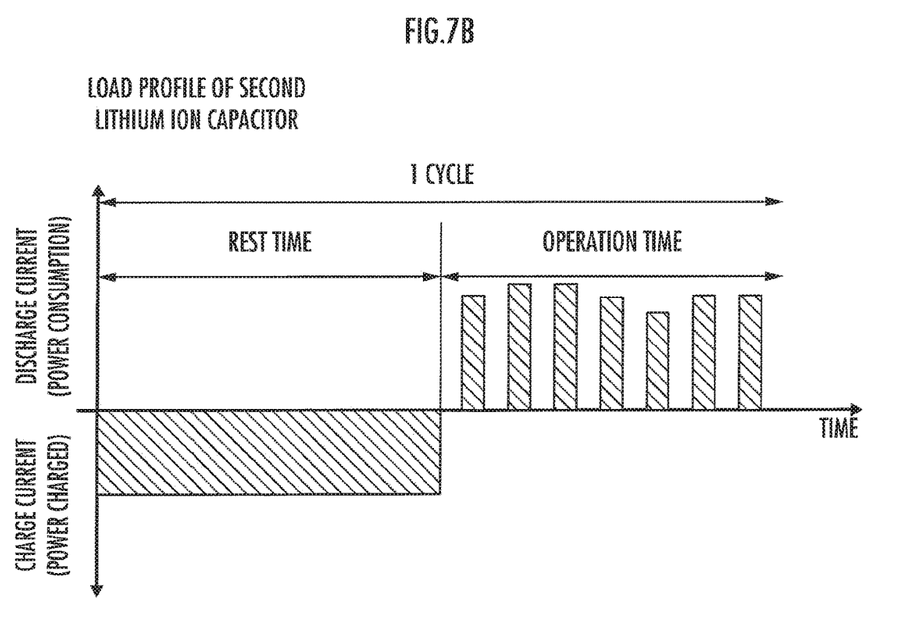

In such case, the profiles of charging and discharging of the lithium ion capacitor installed in each of the end effectors will be the profiles as shown in FIGS. 7A and 7B.

As clear from FIGS. 7A and 7B, in the actuator according to the modified example, since the operation time of the first lithium ion capacitor can be used as the rest time of the second lithium ion capacitor, it is able to secure sufficiently long charge time of the lithium ion capacitor compared to the above embodiment in which one end effector is used (refer to FIG. 2).

Therefore, according to the actuator of the present modified example, it is able to suppress the temperature rise of the secondary battery by making the current flown to the secondary battery smaller during the charge period compared to the actuator of the above embodiment having only one end effector and a lithium ion capacitor. Moreover, since the rest time of one end effector is the operation time of the other end effector, the time in which operation cannot be performed is shorten for the actuator as a whole.

Second Embodiment

Hereinafter, an actuator according to a second embodiment is explained referring to FIG. 8. However, the actuator of the present embodiment only differs from the actuator 1 of the first embodiment in the processing performed by the current setting unit 22h of the control unit 22 of the charging apparatus 20. Therefore, only this processing will be explained in details.

As the charging method of the lithium ion capacitor 11, in addition to a constant current charging method (the charging method in the first embodiment, CC charge), a constant current-constant voltage charging method (CCCV charge) which charges at a constant current until the voltage rises to a certain value and thereafter charges at constant voltage (that is, charging by changing the current), may be adopted.

In the actuator of the present embodiment which adopts such constant current-constant voltage charging method, the value of current varies according to time during charging.

Figure 8:
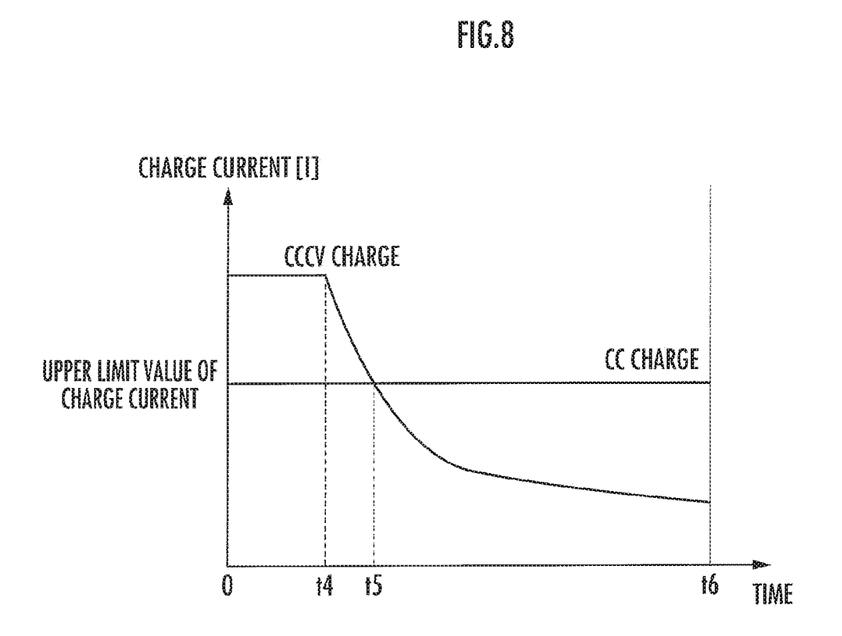
FIG. 8 is a graph showing a change of charge current in a rest time of a lithium ion capacitor of an actuator according to a second embodiment of the present invention.

More specifically, as shown in FIG. 8, in the actuator of the present embodiment, until the predetermined time t4 (the time the voltage rises to a constant value) during the rest time in which the lithium ion capacitor is charged, the charge current is higher than the case of constant current charging method. Then, after the predetermined time t4 (that is, after the voltage rises to the constant value), the charge current decreases.

In a case of using such constant current-constant voltage charging method, there are cases that the charge current temporarily exceeds the upper limit value of the current calculated in the current setting step (for example, the period from t0 to t5 in FIG. 8).

However, as long as the sum of the total amount of heat quantity during the rest time and the total amount of heat quantity during the operation time is equal to or less than the permissible heat quantity of the lithium ion capacitor 11 during the charge period, the shortening of lifetime of the lithium ion capacitor is suppressed.

Therefore, an actuator which is charged by the constant current-constant voltage charging method (that is, the charge current may temporarily exceed the upper limit value of the current calculated in the current setting step) may also adopt the present invention.

Moreover, in case of using the constant current-constant voltage charging method, it is able to efficiently charge in a relatively short time compared to the case of using the constant current charging method.

By the actuator of the present embodiment configured as such, similar to the first embodiment, it is able to shorten the charge period while suppressing the shortening of the lifetime of the lithium ion capacitor 11.

Other Embodiments

Although the illustrated embodiments have been explained above, the present invention is not limited to the above embodiments.

For example, the above embodiments are related to the actuator including the end effector installed with the secondary battery. However, the present invention is not limited to the actuator including the end effector, and can be applied to other devices as long as it use the secondary battery so as to repeat a predetermined period including a discharge period and a charge period.

Moreover, in the above embodiments, various parameters are input to set the range of the charge current before actually starting the operation by the actuator. However, the present invention is not limited to such embodiment. For example, the various parameters may be input in advance and also the temperature or power consumption or the like of the secondary battery may be measured during the operation, and by using the measured data, the appropriate range of the current value may be calculated during the time of moving the end effector from the operation position to the rest position.

EXPLANATION OF REFERENCE NUMBERS

1 . . . actuator, 10 . . . end effector, 11 . . . lithium ion capacitor (secondary battery). 12 . . . end effector side terminal, 13 . . . electric tool, 14 . . . case (housing), 20 . . . charging apparatus, 21 . . . charging apparatus side terminal (charging unit), 22 . . . control unit, 22a . . . lifetime map storing unit, 22b . . . capacitor information storing unit, 22c . . . endothermic and exothermic map storing unit (endothermic and exothermic characteristics storing unit), 22d . . . upper limit temperature recognition unit, 22e . . . state recognition unit, 22f . . . actual temperature recognition unit, 22g . . . maximum power recognition unit, 22h . . . current setting unit, 23 . . . input and output unit (input unit), 30 . . . arm

What is claimed is:

1. A charging current setting method for a secondary battery which repeats a predetermined period including a discharge period and a charge period, comprising:
   an upper limit temperature recognition step which recognizes an upper limit temperature allowed by the secondary battery;
   an actual temperature recognition step which recognizes an actual temperature of the secondary battery;
   a maximum power recognition step which recognizes a maximum power according to heat quantity which the secondary battery can allow during the charge period based on a difference between the upper limit temperature and the actual temperature, a thermal resistance of the secondary battery, a length of the predetermined period, and a length of the charge period; and
   a current setting step which sets current to be flown when charging the secondary battery to be an upper limit value or less by recognizing the upper limit value of the charge current with respect to the secondary battery based on a relational expression or an endothermic and exothermic characteristics map indicating a relation of an exothermic amount or an endothermic amount of the secondary battery with respect to current, and the maximum power.

2. The charging current setting method according to claim 1, wherein
   in the current setting step, current is set to the upper limit value or less, and also preferentially set within a range an endothermic reaction occurs at the secondary battery.

3. The charging current setting method according to claim 1, wherein
   in the upper limit temperature recognition step, the upper limit temperature of the secondary battery is recognized based on a relational expression or a map indicating a change of lifetime of the secondary battery with respect to a temperature of the secondary battery when used and based on an expected lifetime of the secondary battery.

4. The charging current setting method according to claim 1, wherein
   in the actual temperature recognition step, the actual temperature of the secondary battery is recognized based on power consumption and the thermal resistance of the secondary battery in the predetermined period.

5. The charging current setting method according to claim 4, wherein
   in the actual temperature recognition step, the actual temperature of the secondary battery is recognized based on the power consumption of the secondary battery in the predetermined period, the thermal resistance, and a temperature of a housing of the secondary battery or a temperature of cooling medium which cools the secondary battery.

6. A charging method for a secondary battery which repeats a predetermined period including a discharge period and a charge period, comprising:
   an upper limit temperature recognition step which recognizes an upper limit temperature allowed by the secondary battery;
   an actual temperature recognition step which recognizes an actual temperature of the secondary battery;
   a maximum power recognition step which recognizes a maximum power according to heat quantity which the secondary battery can allow during the charge period based on a difference between the upper limit temperature and the actual temperature, a thermal resistance of the secondary battery, a length of the predetermined period, and a length of the charge period;

a current setting step which sets current to be flown when charging the secondary battery to be an upper limit value or less by recognizing the upper limit value of the charge current with respect to the secondary battery based on a relational expression or an endothermic and exothermic characteristics map indicating a relation of an exothermic amount or an endothermic amount of the secondary battery with respect to current, and the maximum power; and a charging step which charges the secondary battery: with the current set in the current setting step.

7. A charging apparatus for a secondary battery which repeats a predetermined period including a discharge period and a charge period, comprising:

a charging unit which supplies current to charge the secondary battery;

a control unit which controls the current supplied to the secondary battery by the charging unit; and an input unit, wherein the control unit comprises, an upper limit temperature recognition unit which recognizes an upper limit temperature of the secondary battery based on a value input by the input unit, a state recognition unit which recognizes a state of the secondary battery, an actual temperature recognition unit which recognizes an actual temperature of the secondary battery based on the state of the secondary battery recognized by the state recognition unit, a maximum power recognition unit which recognizes a maximum power according to heat quantity which the secondary battery can allow during the charge period based on a difference between the upper limit temperature and the actual temperature, a thermal resistance of the secondary battery, a length of the predetermined period, and a length of the charge period, an endothermic and exothermic characteristics information storing unit which stores a relational expression or an endothermic and exothermic characteristics map indicating a relation of an exothermic amount or an endothermic amount of the secondary battery with respect to current, and a current setting unit which sets current supplied from the charging unit to be an upper limit value or less by recognizing the upper limit value of the charge current with respect to the secondary battery based on the relational expression or the endothermic and exothermic characteristics map, and the maximum power.

8. An actuator equipped with a secondary battery which repeats a predetermined period including a discharge period and a charge period, comprising:

a charging apparatus of claim 7 which charges the secondary battery; and an end effector which is installed with the secondary battery and which operates by power supplied from the secondary battery during the discharge period of the secondary battery.

9. An actuator equipped with a secondary battery which repeats a predetermined period including a discharge period and a charge period, comprising:

a first secondary battery;

a second secondary battery;

a charging apparatus of claim 7 which charges the first secondary battery and the second secondary battery;

a first end effector which is equipped with the first secondary battery and which operates by power supplied from the first secondary battery during the discharge period of the first secondary battery; and a second end effector which is equipped with the second secondary battery and which operates by power supplied from the second secondary battery during the discharge period of the second secondary battery, wherein the charging apparatus charges the second secondary battery during the discharge period of the first secondary battery, and also charges the first secondary battery during the discharge period of the second secondary battery.

* * * * *